United States Patent [19]

Pershing et al.

[11] Patent Number: 4,592,289
[45] Date of Patent: Jun. 3, 1986

[54] REDUCING POLLUTANT EMISSIONS FROM A SPREADER-STOKER-FIRED FURNACE BY STOICHIOMETRIC CONTROL

[75] Inventors: David W. Pershing, Salt Lake City, Utah; George B. Martin, Cary, N.C.; James M. Munro, Rapid City, S. Dak.

[73] Assignee: The United States of America as represented by the Administrator of the Environmental Protection Agency, Washington, D.C.

[21] Appl. No.: 543,101

[22] Filed: Oct. 18, 1983

[51] Int. Cl.<sup>4</sup> ............................................. F23J 11/00
[52] U.S. Cl. ................................... 110/345; 110/115; 110/188; 110/257; 110/268; 110/347
[58] Field of Search ................... 110/104 R, 111, 115, 110/185, 186, 188, 244, 248, 251, 255, 257, 268, 269, 270, 328, 329, 344, 345, 347

[56] References Cited

U.S. PATENT DOCUMENTS

| | | | |
|---|---|---|---|
| 2,794,406 | 6/1957 | Stark | 110/101 CA |
| 3,050,202 | 8/1962 | Funk | 110/115 |
| 4,101,632 | 7/1978 | Lamberti et al. | 110/345 |
| 4,155,313 | 5/1979 | Moss | 110/106 |
| 4,182,246 | 1/1980 | Lombana et al. | 110/188 |
| 4,235,174 | 11/1980 | Spurrell | 110/346 |
| 4,246,853 | 1/1981 | Mehta | 110/344 |
| 4,249,470 | 2/1981 | Vatsky | 110/232 |
| 4,359,950 | 11/1982 | Leffler et al. | 110/188 |
| 4,381,718 | 5/1983 | Carver et al. | 110/347 |
| 4,397,248 | 8/1983 | Mehta et al. | 110/263 |
| 4,474,121 | 10/1984 | Lewis | 110/188 |
| 4,485,747 | 12/1984 | Pershing et al. | 110/115 |

OTHER PUBLICATIONS

Steam—Chapter 11: Stokers, 39th ed., Babcock & Wilcox, New York, New York (1982).
K. L. Maloney et al., "Combustion Modification for Coal-Fired Stoker Boilers," Proceedings of the Joint Symposium on Stationary Combustion $NO_x$ Control (vol. III) 83–98 (Oct. 1980).
R. D. Giammar et al., "Evaluation of Emissions and Control Technology for Industrial Stoker Boilers," Proceedings of the Joint Symposium on Stationary Combustion $NO_x$ Control (vol. III) 1–38 (Oct. 1980).

Primary Examiner—Albert J. Makay
Assistant Examiner—Steven E. Warner

[57] ABSTRACT

Methods and apparatus for reducing pollutant emissions, and in particular, for reducing $NO_x$ and particulate emissions, from spreader-stoker-fired furnaces. A combustible material is introduced into the spreader-stoker-fired furnace and combusted while the stoichiometric ratio of oxygen to combustible material in different regions of the furnace is carefully controlled. Control of the stoichiometric ratio is accomplished by controlling the amount of air injected into different regions of the furnace and by controlling the amount of smaller particles of combustible material or fines introduced into the furnace.

6 Claims, 6 Drawing Figures

REDUCING POLLUTANT EMISSIONS FROM A SPREADER-STOKER-FIRED FURNACE BY STOICHIOMETRIC CONTROL

GOVERNMENT RIGHTS

The present invention was developed in part pursuant to support received from the U. S. Environmental Protection Agency through cooperative agreements CR 805899 and CR 809267, and the Government of the United States of America has certain rights under those cooperative agreements.

BACKGROUND

1. The Field of the Invention

The present invention relates to pollution control methods and apparatus, and in particular, to methods and apparatus for reducing pollutant emissions from spreader-stoker-fired furnaces by controlling the stoichiometric ratio of oxygen to combustible material within different regions of the furnaces.

2. The Prior Art

For centuries, man has relied upon the combustion of combustible materials, such as coal and wood, to provide heat energy. One of the most common methods for harnessing this heat energy is to use the energy to generate steam. Over the years, different types of furnaces or boilers have been developed for the combustion of coal, wood, and other combustible materials.

One type of furnace, the stoker-fired furnace, was developed to burn relatively large particles of coal up to about 1.5 inches in diameter. Later, another type of furnace, the pulverized coal-fired furnace, was developed for burning much smaller coal particles, e.g., where about 70% of the coal particles pass through a 200 mesh screen. Pulverized coal-fired furnaces have large steam generating capacities and are thus typically used in steam generating installations where at least 500,000 pounds of steam per hour are required. The electric power generating industry has been one of the largest users of pulverized coal-fired furnaces, since large amounts of steam are required for the production of electric energy.

Because of the small particle sizes of coal which are used in the pulverized coal-fired furnaces, expensive pulverizing steps are necessarily employed to reduce the particle size of the coal. Moreover, pulverized coal-fired furnaces involve extensive capital outlays. As a result, whenever practical, those skilled in the art prefer to use stoker-fired furnaces. Stoker-fired furnaces have especially found utility in smaller operations where the steam generating capacity of the stoker-fired furnace is sufficient to meet the needs of the operation.

In the late 1940's and early 1950's, there was a large decline in the demand for commercial and industrial solid fuel-fired systems (such as the stoker-fired and pulverized coal-fired systems) due to the wide-spread availability of relatively cheap oil and natural gas sources. In the 1960's, the stoker-fired and pulverized coal-fired systems became even less attractive because of their relatively high pollutant emissions when compared with the oil and gas-fired systems. Thus, the oil and gas-fired systems substantially replaced the coal-fired systems in the small industrial and commercial sector until the gas and oil petroleum-based fuels became less plentiful during the 1970's. The petroleum shortage experienced during the 1970's has caused industry to begin to look once again to the coal-fired and other solid fuel-fired systems.

In recent years, considerable emphasis has been given to solid fuel research, particularly in the area of burning solid fuels such as coal and wood without excessive pollutant emissions. As the costs of oil and gas continue to escalate, the utilization of solid fuel systems (such as coal-fired systems) wll continue to increase. In particular, the use of stoker-fired systems in small operations is increasing due to the substantial savings involved when the larger coal particles are introduced into the furnace without expensive pulverizing steps as are necessary for the pulverized coal-fired processes.

One popular type of stoker-fired furnace is the spreader-stoker-fired furnace. The spreader-stoker-fired furnace is characterized in that it has a paddle wheel-type mechanism or air jet for flinging the coal particles into the furnace such that the coal particles are suspended in and travel through a suspension or overthrow region within the furnace for an appreciable period of time before falling onto a grate located at the bottom of the furnace. This suspension of the coal particles within the suspension region of the spreader-stoker-fired furnace is commonly referred to as the "suspension phase."

In typical spreader-stoker-fired furnace systems, a portion of the coal is combusted in the suspension phase, before reaching the grate. Coal particles which are not burnt during their descent in the suspension phase come to rest against the grate and from a burning fuel bed in a bed region of the furnace. Other coal particles are entrained by the upward flow of gases within the furnace and are not combusted or are only partially combusted in the suspension region; these coal particles escape in the furnace effluent.

The grate on which the burning fuel bed resides moves at a very slow rate, e.g., from about 5 to 40 feet per hour, and eventually dumps the combustion by-products (namely, residual ash) into an ash pit. Alternatively, the grate may be stationary but have the capability of being dumped at periodic intervals to remove the bed of accumulated ash. Further, the grate may be a stationary inclined grate which is vibrated to move the ash down the grate and thereby discharge the ash from the lower end of the grate.

One reason for the popularity of the spreader-stoker-fired furnace is its high superficial grate heat release rates of up to 750,000 Btu/hr-ft$^2$ and its low inertia due to nearly instantaneous fuel ignition upon increased firing rate. This high superficial grate heat release is obtained because of the relatively uniform distribution of the coal particles in the burning fuel bed on the grate, the relatively small depth of the layer of coal particles on the grate, and the intense combustion in the suspension region above the burning fuel bed. The low inertia allows the spreader-stoker-fired furnace to respond rapidly to load fluctuations in steam demand and, hence, in boiler load which are common in industrial applications.

In addition, spreader-stoker-fired furnaces are capable of firing fuels with a wide range of burning characteristics, including coals with caking tendencies, since rapid surface heating of the coal in the suspension phase destroys the caking propensity. Additionally, little or no fuel preparation is required for spreader-stoker firing of coal; if needed, the coal can be crushed to particle sizes of about 1.5 inches or less in diameter and directly fired. In other types of stoker-fired furnaces, the coal particles are typically introduced directly onto the burning fuel bed at the bottom of the furnace without experiencing a suspension phase.

During the combustion of solid fuels (such as coal), nitrogen which is bound primarily in heterocyclic ring structures is liberated as CN fragments which subsequently react to form nitrogen gas ($N_2$) or nitrogen oxide pollutants. The nitrogen oxide pollutants, generally designated $NO_x$, are primarily in the form of nitric oxide (NO) and nitrogen dioxide ($NO_2$). While the nitrogen gas emissions are relatively harmless, the $NO_x$ emissions are highly toxic. Nitrogen dioxide is an especially dangerous pollutant since $NO_2$, as well as other pollutants such as $SO_2$ and $SO_3$, are often responsible for what is known as acid rain. Even if the $NO_x$ emissions are in the form of NO, which is the favored nitrogen oxide formed in most combustion processes, NO is readiy oxidized in the atmosphere to $NO_2$.

Other pollutant emissions characteristic of spreader-stoker-fired furnaces include particulate emissions. Particulate emissions become a particular problem in spreader-stoker-fired furnaces since the solid fuel or coal particles are suspended for an appreciable period of time during the suspension phase where they are contacted by the rising flow of combustion gases and a relatively forceful stream of air. Such contact between the particles and the flow of gases during the suspension phase increases the amount of coal, ash, and other particulates which are entrained in the furnace effluent.

In view of the wide-spread popularity of the spreader-stoker-fired furnace for the combustion of coal, wood, and other combustible materials, it would be a significant advancement in the art to provide a method and apparatus for reducing pollutant emissions, and in particular for reducing $NO_x$ and particulate emissions, from such spreader-stoker-fired systems. Such a method and apparatus are disclosed and claimed herein.

BRIEF SUMMARY AND OBJECTS OF THE INVENTION

The present invention relates to methods and apparatus for reducing pollutant emissions, and in particular for reducing $NO_x$ and particulate emissions, from spreader-stoker-fired furnaces. According to the present invention, as quantity of combustible material is obtained and, if necessary, is comminuted, and then introduced into the spreader-stoker-fired furnace where it is combusted to produce heat for the production of steam or other purposes.

For purposes of the present invention, different regions are defined in the spreader-stoker-fired furnace: (1) is a bed region, (2) an under-spreader region, (3) an over-spreader region, and (4) an exhaust or final burn-out region. The ratio of oxygen to combustible material is controlled in at least three regions of the spreader-stoker-fired furnace: the bed region, the under-spreader region, and the over-spreader region. (In the prior art, the term "suspension region" is commonly used in connection with spreader-stoker-fired furnaces; however, it will be understood that the suspension region of the prior art includes the areas which are defined by the terms "under-spreader region," "over-spreader region," and "exhaust region," as used in connection with the present invention. The term "suspension phase" as used both in the prior art and in connection with the present invention refers to that period of time from introduction of the particles of combustible material by the spreader into the furnace until the particles come to rest against the grate at the bottom of the furnace or escape through the furnace exhaust.)

By controlling the amount of oxygen and/or combustible material introduced into the bed, under-spreader, and over-spreader regions, the stoichiometric ratio of oxygen to combustible material in each of these three regions may be carefully controlled to produce a minimal amount of pollutants. The stoichiometric ratio of oxygen to combustible material is controlled such that the stoichiometric ratio is from about 0.5 to about 1.2 in the bed region, from about 0.7 to about 1.3 in the under-spreader region, and from about 0.5 to about 1.2 in the over-spreader region of the spreader-stoker-fired furnace. An additional way in which the stoichiometric ratio may be controlled in the over-spreader region is by controlling the quantity of smaller particles of combustible material or fines introduced into the over-spreader region so as to create a fuel-rich zone.

By controlling the stoichiometric ratio of oxygen to combustible material, the amount of $NO_x$ emissions produced in the spreader-stoker-fired furnace can be minimized, and the amount of $NO_x$ reduced to nitrogen gas can be maximized. Moreover, particulate emissions are reduced since not as much air is introduced through the grate supporting the burning fuel bed as is done in the prior art pocesses. The result is that the number of particulates lifted off the bed and the number of particulates entrained within the furnace are reduced.

It is, therefore, an object of the present invention to provide methods and apparatus for reducing pollutant emissions, such as $NO_x$ emissions and particulate emissions, from spreader-stoker-fired furnaces.

Another object of the present invention is to provide spreader-stoker-fired furnaces wherein the stoichiometric ratio of oxygen to combustible material may be carefully controlled in different regions of the furnaces.

A further object of the present invention is to provide improved methods and apparatus for the combustion of combustible materials such as coal and wood.

These and other objects and features of the present invention will become more fully apparent from the following description and appended claims, taken in conjunction with the accompanying drawings.

BRIEF DESCRIPTION OF THE DRAWINGS

FIG. 6 is a graphical representation in which the particulate emissions of the experiments of FIG. 4 are plotted.

DETAILED DESCRIPTION OF THE PREFERRED EMBODIMENTS

It will be noted that, for the sake of brevity, the following discussion is given in terms of an apparatus and method using coal; nevertheless, it will be readily appreciated that the following detailed description of the invention also applies to any other combustible material (e.g., wood, peat, char, and municipal, industrial, and agricultural wastes) which may be burned in spreader-stoker-fired furnaces.

Spreader-stoker-fired furnace processes have been thought to be much more efficient than other stoker-fired furnaces due to the improved exposure of the coal particles to oxygen during the suspension phase. In a typical spreader-stoker-fired furnace, about eighty-five percent (85%) of the air or oxygen introduced into the furnace is introduced through the grate and burning fuel bed at the bottom of the furnace (commonly referred to as "underfire air"). The remaining 15% of the air is introduced through a series of air jets typically located at about 18 and about 72 inches above the furnace bed (commonly referred to as "overfire air").

In the prior art, it was thought that about forty to sixty percent (40-60%) of the coal particles were burned during the suspension phase. Recently, however, applicants have discovered that, in actuality, only about ten percent (10%) of the coal particles are combusted during the suspension phase.

While only about 10% of the coal is burned during the suspension phase, applicants have further discovered that about thirty percent (30%) of the total NO$_x$ pollutants produced in the spreader-stoker-fired furnace systems are produced during the suspension phase. Thus, although the spreader-stoker-fired furnace method for combusting coal provides good exposure of the coal particles to oxygen during the suspension phase, applicants have discovered that this creates the problem of an unduly large amount of NO$_x$ pollutants which are emitted during this suspension phase. The large quantities of NO$_x$ formed during the suspension phase thus contribute significantly to the problem of overall NO$_x$ emissions from a typical spreader-stoker-fired furnace.

Figure 1:
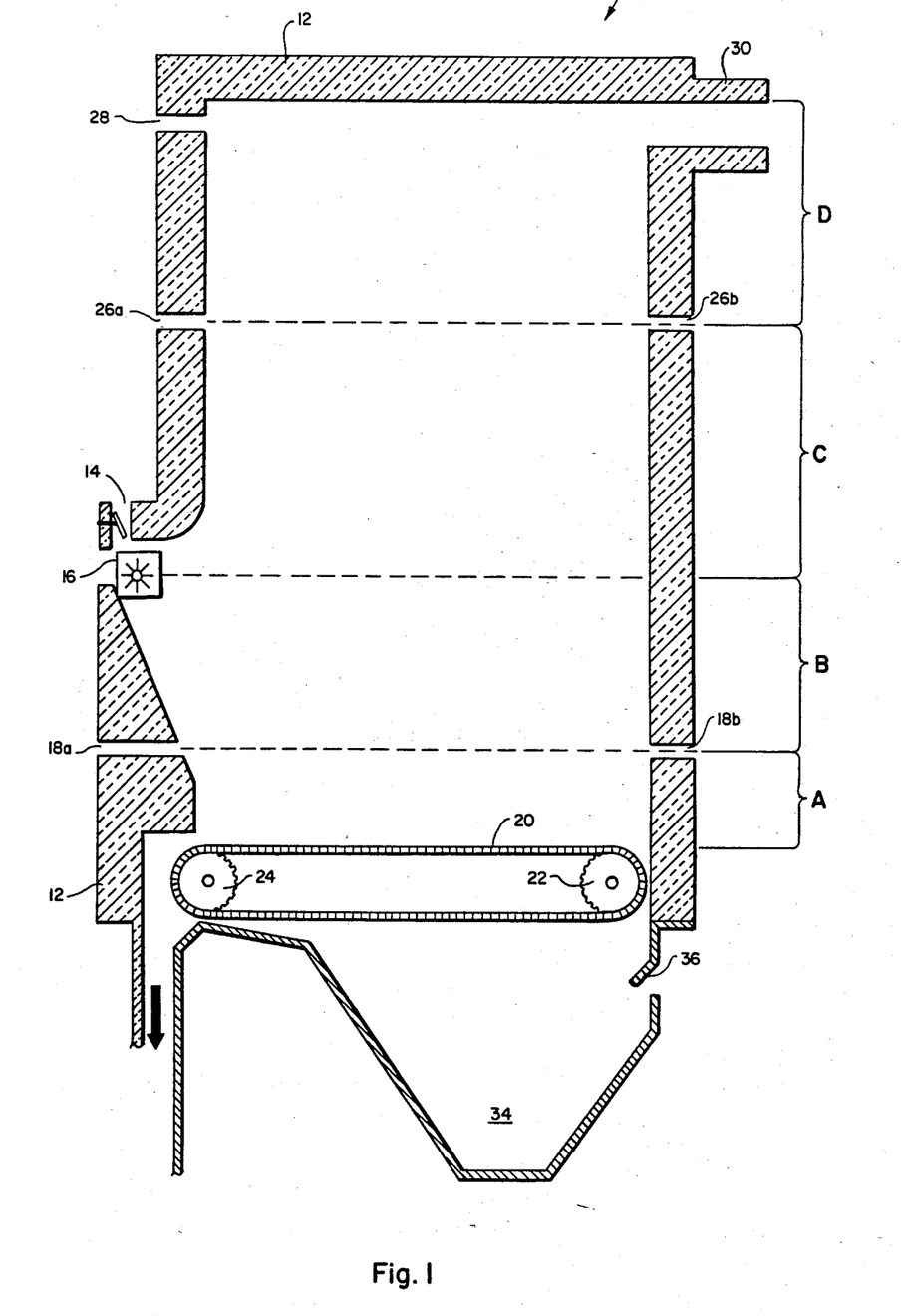
FIG. 1 is a schematical illustration of a typical spreader-stoker-fired furnace which may be used in accordance with the present invention.

Reference is now made to the drawings wherein like parts are designated with like numerals throughout. Referring particularly to FIG. 1, a presently preferred embodiment of a spreader-stoker-fired furnace is generally designated 10. The apparatus includes a housing 12 made of high temperature refractory or insulating material. Such refractory or insulating materials are well-known in the art and are fabricated to withstand the hot furnace temperatures which may reach as high as about 1900° C. Typically, a plurality of boiler tubes (not shown) through which water is circulated are mounted ajacent housing 12 when the furnace 10 is used for the generation of steam or hot water. In such a furnace, the water within the boiler tubes is converted to steam or hot water as the furnace is heated by combustion of the combustible material therein.

Formed in spreader-stoker-fired furnace 10 is a coal feed port 14 for introducing coal into furnace 10. A rotating paddle wheel-type spreading mechanism 16 is mounted within furnace 10 adjacent coal feed port 14 and serves to fling the incoming coal into the interior of furnace 10. Alternatively, other spreading means such as and air jet (not shown) may be used in lieu of spreading mechanism 16 to fling the coal into the furnace.

Formed at the bottom of spreader-stoker-fired furnace 10 is a moving chain grate 20 which supports a burning fuel bed inside furnace 10 during the operation thereof. Moving grate 20 rotates around two rotating drive wheels 22 and 24 which are powered by any conventional means. The speed of moving grate 20 can be regulated such that the grate moves between about 5 and about 40 feet per hour. As grate 20 advances, it serves to dump residual ashes formed during combustion into an ash pit (not shown) in the direction of the arrow shown in FIG. 1.

An air source (not shown) supplies air to an air chamber 34 through a blast gate 36. From air chamber 34, the air passes through grate 20 and into furnace 10. Additionally, overfire air ports 18$a$ and 18$b$ are formed in housing 12 and provide additional sites for introducing air into furnace 10 from an air source (not shown). Moreover, a second pair of overfire air ports 26$a$ and 26$b$ are provided above paddle wheel 16 to provide further sites for introducing air into furnace 10 from an air source (not shown).

A flue 30 is provided at the upper end of furnace 10 to accommodate exit of the effluent gases from furnace 10 and into, for example, the convective passages of a boiler (not shown). A flue gas sampling port 28 may also be optionally provided in housing 12 so as to provide a means for sampling the effluent gases from furnace 10.

Importantly, spreader-stoker-fired furnace 10 of the present invention is divided into four principal regions: (A) a bed region; (B) an under-spreader region; (C) an over-spreader region; and (D) an exhaust or final burnout region. These regions are denoted by brackets A, B, C, and D, respectively, in FIG. 1. It is the careful control of the stoichiometric ratio of oxygen to combustible material within bed region A, under-spreader region B, and over-spreader region C which enable furnace 10 to operate with reduced pollutant emissions. The control of the stoichiometric ratio of oxygen to combustible material in each of these regions of the furnace will be explained in more detail hereinafter.

The general operation of the apparatus of the present invention and one preferred embodiment of the methods of the present invention will now be explained. A quantity of coal or other combustible material of variously sized particles is procured. If relatively large coal particles are present in the coal, the coal is preferably comminuted to reduce the particle size to about 1.5 inches or less in diameter, or the coal particles larger than about 1.5 inches in diameter are preferably separated out from the remaining smaller coal particles.

The coal particles are then introduced into spreader-stoker-fired furnace 10 illustrated in FIG. 1 through coal feed port 14. As the coal particles are introduced into coal feed port 14, they are engaged by rotating paddle wheel 16 and flung into the interior of spreader-stoker-fired furnace 10. The flung coal particles then fall downwardly by the force of gravity through the interior of furnace 10, until coming to rest against grate 20. The accumulated coal particles against grate 20 thus form a burning fuel bed against grate 20 in bed region A.

Particles which are small enough to be entrained in the hot, upward flowing gases, are combusted, at least partially, while suspended in the over-spreader region C and the exhaust region D. The larger particles are heated and may partially devolatilize or combust while falling through the under-spreader region B of furnace 10 before coming to rest in the bed region A upon grate 20.

Ash and other by-products formed during combustion are dumped off of moving grate 20 and into the ash pit, typically from about 1 to about 10 hours after initial introduction of the coal particles into the furnace. An alternative to moving chain grate 20 would be a stationary chain grate which would be dumped at periodic intervals to remove the bed of accumulated ash. A further alternative to moving chain grate 20 would be a stationary inclined grate which is vibrated to move the ash down the grate and thereby discharge the ash from the lower end of the grate. Both moving and stationary grates are well known in the art.

The gases resulting from the combustion of the coal particles rise upwardly through furnace 10. If desired, these combustion gases may be sampled through flue gas sampling port 28 so as to monitor the concentration of $O_2$, $CO$, $CO_2$, $NO$, $NO_2$, and $SO_2$ in the exhaust gases. The combustion gases finally exit furnace 10 through flue 30.

The key to the present invention is the control of the stoichiometric ratio of oxygen to combustible material in bed region A, under-spreader region B, and over-spreader region C of spreader-stoker-fired furnace 10. In particular, it has been found desirable to control the stoichiometric ratio of oxygen to combustible material such that the stoichiometric ratio is from about 0.5 to about 1.2 in bed region A, from about 0.7 to about 1.3 in underspreader region B, and from about 0.5 to about 1.2 in over-spreader region C of furnace 10.

Below the lower limits of the above-mentioned ranges for the stoichiometric ratios in bed region A, under-spreader region B, and over-spreader region C, there is not sufficient oxygen to adequately support the combustion of the coal; moreover, smoking problems also tend to occur below the lower limits of these ranges. Above the upper limits of the above-mentioned ranges for the stoichiometric ratios, the pollutant reduction advantages of the present invention begin to disappear. Thus, maintenance of the stoichiometric ratios within these ranges is important in achieving the pollutant reduction results of the present invention.

Such control of the stoichiometric ratio in bed region A, under-spreader region B, and over-spreader region C, is achieved by controlling the amount of air injected through grate 20, overfire air ports 18a and 18b, and overfire air ports 26a and 26b. The stoichiometric ratio in overspreader region C of furnace 10 may be further controlled by controlling the amount of small particles of combustible material or fines which are introduced by the spreader into over-spreader region C so as to create a fuel-rich zone thereat. The presently preferred stoichiometric ratios for each of these regions are from about 0.6 to about 0.8 in bed region A, from about 0.9 to about 1.1 in under-spreader region B, and from about 0.75 to about 0.95 in over-spreader region C of spreader-stoker-fired furnace 10. In one specific application of the present invention, the stoichiometric ratio is about 0.7 in bed region A, about 1.0 in under-spreader region B, and about 0.85 in over-spreader region C of the spreader-stoker-fired furnace.

In the present invention, where possible, it is preferable to maintain bed region A fuel-rich. The presently preferred stoichiometric ratios given above for each of the regions of the spreader-stoker-fired furnace provide for such a fuel-rich bed region. These presently preferred stoichiometric ratios work well for combustible materials which generally do not have significant propensities for clinker formation, for example, for fuels such as wood, peat, combustible wastes, and coal with a high ash fusion temperature.

However, some combustible materials, such as high ash content coal or other biomaterials containing significant amounts of ash, may have relatively high propensities for clinker formation, thus making it less practical to operate bed region A under fuel-rich conditions. This is because under fuel-rich conditions in the bed region, clinkering often occurs with such fuels, thereby forming a molten mass of fuel within the bed region which substantially interferes with the operation of the furnace. Hence, when combustible materials which have significant clinkering propensities are burned in the spreader-stoker-fired furnace of the present invention, it is generally desirable to operate the bed region under somewhat air-rich conditions.

Thus, when fuels having a significant propensity for clinker formation are used in the present invention, the presently preferred stoichiometric ratios for each of the regions of the spreader-stoker-fired furnace are from about 1.0 to about 1.2 in bed region A, from about 1.0 to about 1.2 in under-spreader region B, and from about 0.75 to about 0.95 in over-spreader region C. From the foregoing, it will be appreciated that the exact stoichiometric ratios used in the spreader-stoker-fired furnace of the present invention may vary somewhat according to the types of fuels burned within the furnace.

Although control of the stoichiometric ratio of oxygen to combustible material within exhaust region D is not critical to the pollutant reduction techniques of the present invention, it has been found to be generally desirable to maintain the stoichiometric ratio within exhaust region D at from about 1.1 to about 2.0 in order to avoid wasting large amounts of fuel and heat. In one presently preferred embodiment, the stoichiometric ratio within exhaust region D is maintained at from about 1.25 to about 1.45. In one specific application of the present invention, the stoichiometric ratio within exhaust region D is maintained at about 1.35.

In conventional spreader-stoker-fired furnaces, about eighty-five percent (85%) of the air needed to support the combustion process is introduced through the grate and the burning fuel bed. The remaining fifteen percent (15%) of the air is introduced through the overfire air ports. In applicant's novel spreader-stoker-fired furnace and method, about thirty percent (30%) to about eighty-five percent (85%) of the air needed to support the combustion process is introduced through grate 20, about zero percent (0%) to about sixty percent (60) of the air is introduced through overfire air ports 18a and 18b, and about fifteen percent (15%) to about seventy percent (70%) of the air is introduced through overfire air ports 26a and 26b. Such distribution of the air introduced into spreader-stoker-fired furnace 10 results in the stoichiometric ratios discussed above, namely, about 0.5–1.2 in bed region A, about 0.7–1.3 in under-spreader region B, and about 0.5–1.2 in over-spreader region C.

A presently preferred embodiment for non-clinkering fuels involves introducing from about forty-five percent (45%) to about sixty percent (60%) of the air through grate 20, from about ten percent (10%) to about thirty-five percent (35%) of the air through overfire air ports 18a and 18b, and from about thirty percent (30%) to about forty-five percent (45%) of the air through overfire air ports 26a and 26b. Such distribution of the air introduced into spreader-stoker-fired furnace 10 results in the presently preferred stoichiometric ratios discussed above, namely, about 0.6–0.8 in bed region A, about 0.9–1.1 in under-spreader region B, and about 0.75–0.95 in over-spreader region C.

Factors which determine the exact stoichiometric ratio of each of the regions of the spreader-stoker-fired furnace in accordance with the present invention include the percent of fines in the coal feed, the content of volatile material in the coal, the ash fusion temperature, the physical design of the spreader-stoker-fired furnace, and the level of emissions reduction required.

The novel apparatus and methods of the present invention, which provide for control of the stoichiometric ratio of oxygen to combustible material within the different regions of a spreader-stoker-fired furnace, yield advantageous results in terms of the reduction of pollutant emissions from the furnace. For example, control of the stoichiometric ratio results in substantially lower $NO_x$ emissions. Experimental studies have also shown that by controlling the stoichiometric ratio of oxygen to combustible material within the different regions of the spreader-stoker-fired furnace, the particulate emissions in the furnace effluent are also reduced. Thus, the novel apparatus and methods of the present invention serve to reduce both $NO_x$ and particulate emissions from a spreader-stoker-fired furnaces.

The formation of $NO_x$ in a spreader-stoker-fired furnace is strongly affected by the local availability of oxygen in the primary fuel/air mixing zone, i.e., near the spreader, and in the bed region A. If the oxygen level at the bottom of the over-spreader region C and at the top of the under-spreader region B (i.e., near the spreader) is low enough that the mean stoichiometric ratio of oxygen to combustible material is less than 1, the oxidation of nitrogen in the combustible material to $NO_x$ is reduced, and reduction of $NO_x$ to $N_2$ in the over-spreader region C of the $NO_x$ formed in bed region A is enhanced.

A series of experiments were conducted in a suspension furnace, simulating the over-spreader region C of the spreader-stoker-fired furnace of the present invention, using a standard Utah coal to observe this phenomenon. The oxygen level in the furnace exhaust was maintained at about six percent (6%) excess oxygen ($O_2$). The coal particles were 0.063 inches or less in diameter and were introduced at the bottom of the suspension furnace. The furnace temperature was maintained at about 1100° C. The excess oxygen at the bottom of the suspension region of the suspension furnace was progressively reduced in each successive experiment from about 7.75% excess $O_2$ to about 0.6% excess $O_2$, and the amount of oxygen added to the top of the suspension region was correspondingly increased. In this manner, after combustion of the coal particles within the suspension furnace, the stoichiometric ratio ($SR_s$) at the top of the suspension furnace was from about 1.45 to about 0.25. The results of these experiments are graphically illustrated in FIG. 2.

Figure 2:
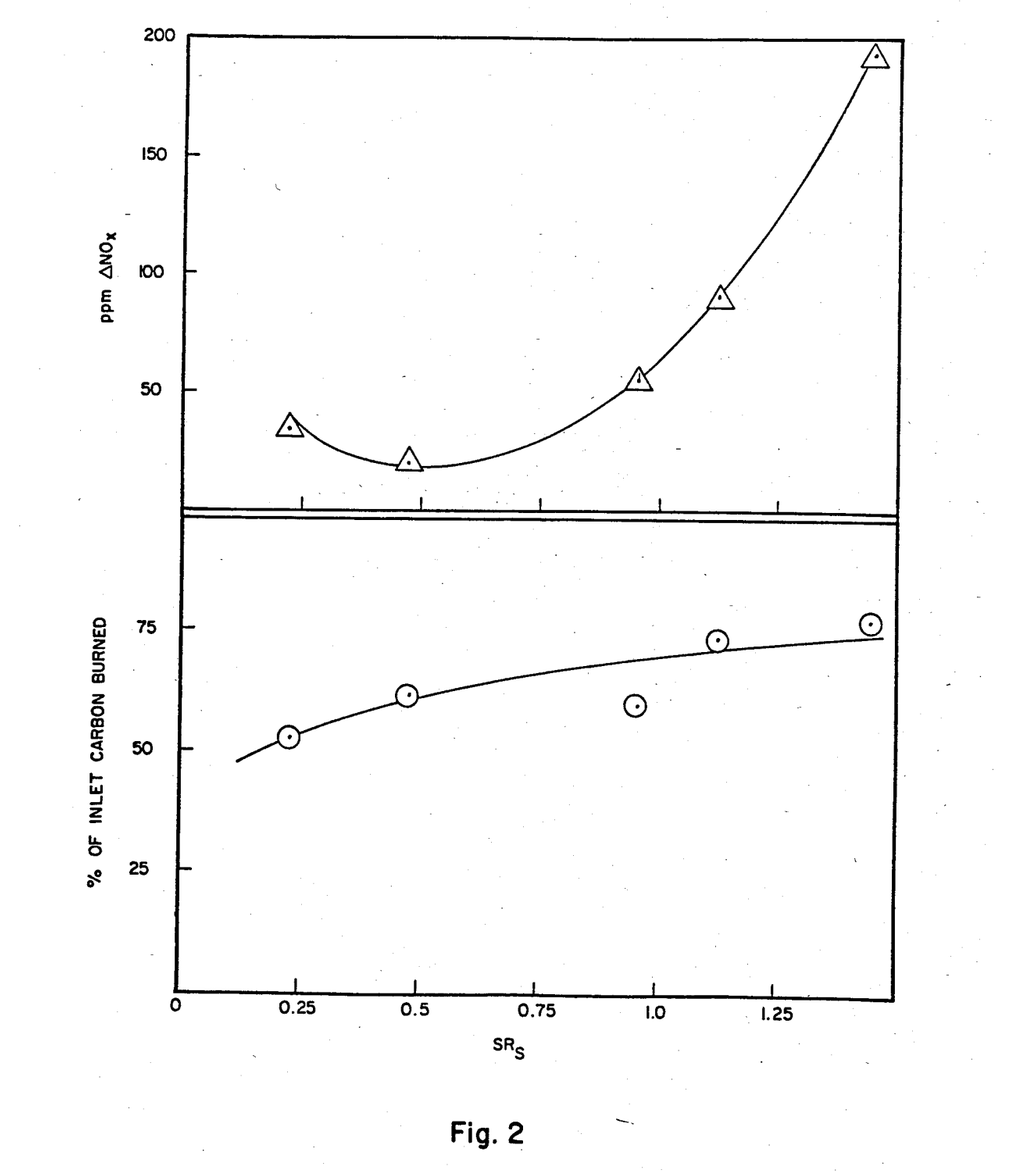
FIG. 2 is a graphical representation in which the $NO_x$ emissions and the percent of carbon burned in the suspension zone of an experimental suspension furnace simulating the suspension phase of the present invention are plotted versus the stoichiometric ratio within the suspension zone.

In FIG. 2, the percent carbon in the coal burned (represented by circles) and the parts per million (ppm) of $NO_x$ (represented by triangles) are plotted against the stoichiometric ratio ($SR_s$) at the top of the suspension region of the suspension furnace. As seen in FIG. 2, the percent of the inlet carbon which burned in the suspension region of the suspension furnace decreased slightly with decreasing suspension region stoichiometry due to reduced entrainment and decreased oxygen availability. However, decreasing the suspension region stoichiometry had a major effect on the amount of $NO_x$ produced during the combustion of the coal in the suspension region of the suspension furnace. At $SR_s=1.45$ (normal prior art operating conditions) the amount of $NO_x$ produced in the suspension region of the suspension furnace was about 198 ppm. As the suspension region stoichiometry was reduced below about 1.45, the amount of $NO_x$ formed during combustion in the suspension region decreased substantially. From the reported data in FIG. 2, it has been found that a stoichiometric ratio of from about 0.5 to about 1.2 in the suspension region of the suspension furnace (and thus, by analogy, in over-spreader region C of the spreader-stoker-fired furnace of the present invention), minimizes the formation of $NO_x$ from suspension region combustion, yet provides enough oxygen for satisfactory combustion in the suspension region.

Additional tests were conducted in a model spreader-stoker-fired furnace constructed as a small scale model of the embodiment shown in FIG. 1. The grate size of the model spreader-stoker-fired furnace was about one square foot. The spreader was located about 32 inches about the grate. Air was injected through the overfire air ports below the spreader at a height of about 20 inches (corresponding to overfire air ports 18a and 18b in FIG. 1) in a series of first experiments, and air was injected through overfire air ports above the spreader at a height of about 48 inches (corresponding to overfire air ports 26a and 26b in FIG. 1) in a second set of experiments. The stoichiometric ratio of the bed region and the overall stoichiometric ratio were maintained at 0.64 and 1.58, respectively. The $NO_x$ emissions were measured for both sets of experiments, and the results are graphically illustrated in FIG. 3.

Figure 3:
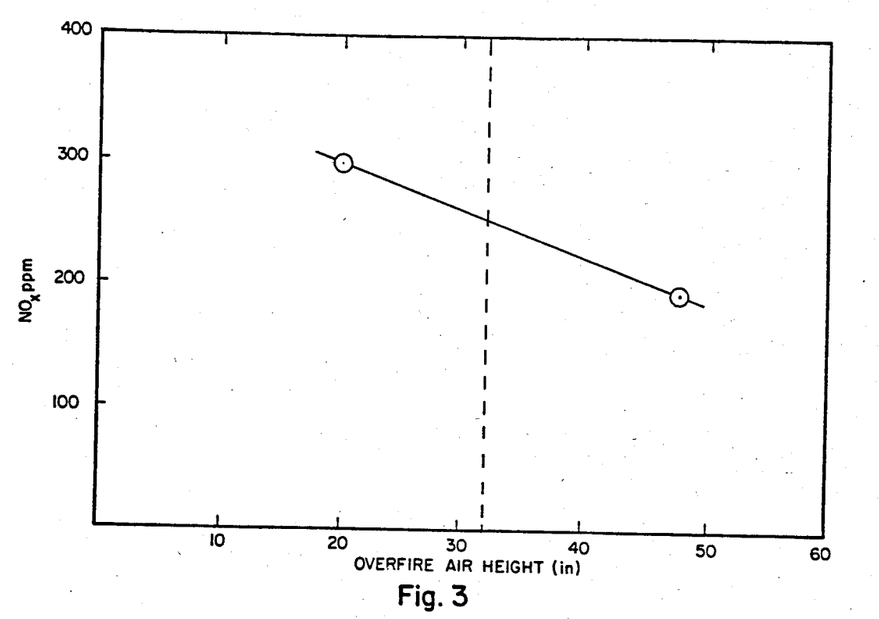
FIG. 3 is a graphical representation in which the $NO_x$ emissions are plotted versus the height of injection of overfire air in experiments conducted using a model spreader-stoker-fired furnace substantially similar to the embodiment of the present invention illustrated in FIG. 1.

In FIG. 3, the parts per million (ppm) of $NO_x$ emissions were plotted against the overfire air height in inches. The dashed line represents the height of the spreader. As seen in FIG. 3, the amount of $NO_x$ emissions was reduced significantly by injecting the air above the spreader. Thus, one of the important concepts of the present invention is to add at least some of the overfire air above the spreader because this decreases the amount of the fuel which is entrained (and hence burnt) in the suspension region. Moreover, by adding at least some of the overfire air above the spreader, the amount of oxygen immediately available in the above-spreader region C is decreased, thereby resulting in lower $NO_x$ emissions. In a presently preferred embodiment, the final overfire air would be added at least two feet about the spreader level to ensure adequate residence time of the fine coal particles in the above-spreader region C to obtain the reduced emissions indicated in FIG. 3.

Reduced pollutant emissions through controlling the oxygen to fuel ratio in regions A–C of the furnace, can be achieved in the present invention not only by controlling the amount of oxygen entering each of regions A–C, but also by controlling the amount of fines introduced into overspreader region C. It should be noted that coal fines in the coal feed are thus not necessarily undesirable in the present invention and that the fines may actually be used to achieve low $NO_x$ emissions. The addition of coal fines can be used to help maintain the relatively low oxygen to combustible material stoichiometric ratio in the overspreader region C which is characteristic of the present invention.

Figure 4:
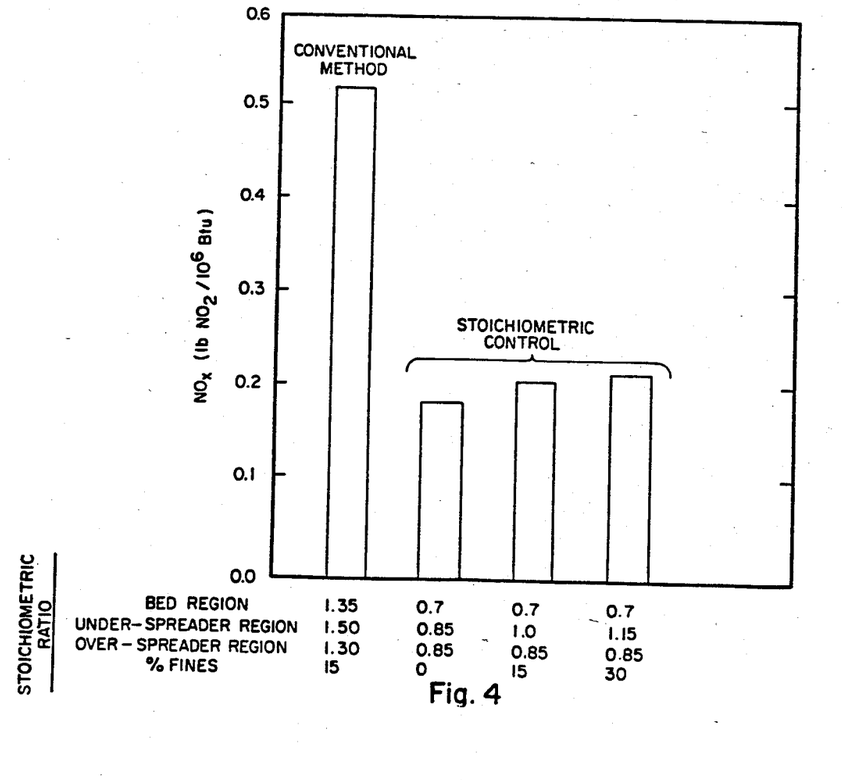
FIG. 4 is a graphical representation in which the $NO_x$ emissions are plotted versus various stoichiometric ratios used in experiments conducted using a model spreader-stoker-fired furnace in accordance with the present invention, wherein the stoichiometric ratios of the various furnace regions were varied by changing the air distribution and/or the amount of coal fines in the coal feed.

A series of experiments was conducted wherein coal containing 0%, 15%, and 30% fines (particles smaller than about 0.1 inches) were combusted in the model spreader-stoker-fired furnace used to gather the data reported in FIG. 3. The presently preferred stoichiometric ratios in the bed, under-spreader, and over-spreader regions for each proportion of coal fines were used in these experiments and are graphically illustrated in FIG. 4. The stoichiometric ratio in the exhaust region was maintained at about 1.4 for all experiments. As seen in FIG. 4, the $NO_x$ emissions were reduced dramatically using the stoichiometric ratio controls of the present invention when compared to conventional methods using excess air. Indeed, the stoichiometric control of the present invention resulted in less than one-half of the $NO_x$ emissions experienced using conventional methods. Proposed EPA standards would limit the acceptable level of $NO_x$ emissions to 0.5–0.6 lbs $NO_2/10^6$ Btu. As seen in FIG. 4, these proposed standards may not be met by the prior art, but are met in the present invention.

Figure 5:
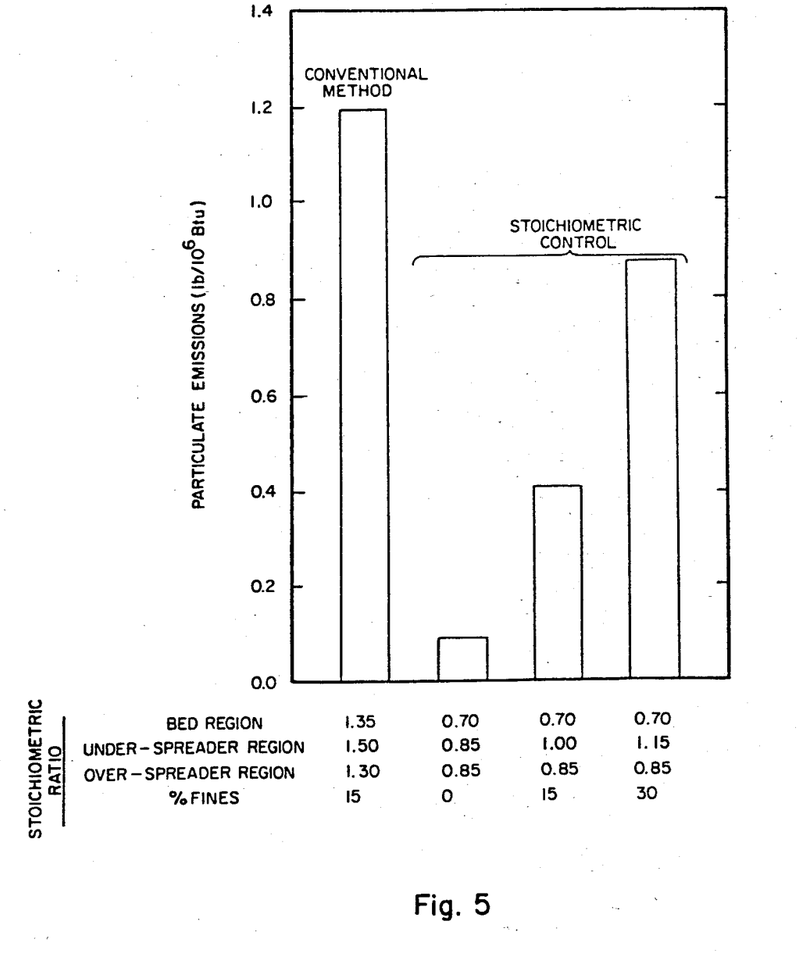
FIG. 5 is a graphical representation in which the NO$_x$ emissions are plotted versus various stoichiometric ratios used in experiments conducted burning coal having substantial propensity for clinker formation in a model spreader-stoker-fired furnace in accordance with the present invention, wherein the stoichiometric ratios of the various furnace regions were varied by changing the air distribution and/or the amount of coal fines in the coal feed, and wherein the bed region of the furnace was maintained air-rich so as to avoid clinkering of the coal within the bed region.

An additional series of experiments was conducted wherein coal having significant clinkering propensities was combusted in the model spreader-stoker-fired furnace used to gather the data reported in FIG. 3. Experiments were run using coal containing 0%, 15% and 30% fines (particles smaller than about 0.1 inches). Stoichiometric ratios suitable for the bed, under-spreader, and over-spreader regions for fuels having clinkering propensities were used in these experiments and are graphically illustrated in FIG. 5. As seen in FIG. 5, the $NO_x$ emissions were reduced significantly when using the stoichiometric ratio controls of the present invention over conventional methods, even where some excess air was used in the bed region to prevent clinkering of the coal.

Thus, as seen in FIGS. 4 and 5, the present invention achieves substantial reduction in $NO_x$ emissions by controlling the stoichiometric ratio within different regions of the spreader-stoker-fired furnace. Moreover, the present invention achieves such $NO_x$ reduction without substantial expense and without significant equipment modifications. The present invention may be applied to virtually any existing spreader-stoker-fired furnace by controlling the amount of oxygen introduced into different regions of the furnace and/or by controlling the amount of fines introduced at the spreader. Thus, the present invention offers an extremely simple and inexpensive way of reducing pollutant emissions in a substantial manner.

Moreover, through the presence or addition of coal fines in the coal feed, some reduction of the $NO_x$ pollutants to nitrogen gas can be accomplished. Introduction of the coal fines by the spreader into the over-spreader region serves to create a locally fuel-rich region where NO may be reduced by hydrocarbon fragments.

The exact overall mechanism by which such $NO_x$ reduction is accomplished depends on which of several steps are used to produce the desired reduction in emissions. Following are examples of emission reduction steps which determine the exact reaction mechanism. First, the bed region stoichiometry may be reduced to generate a fuel-rich (oxygen deficient) environment at the top of the burning coal bed and thus minimize the conversion of nitrogen chemically bound in the coal to $NO_x$. Second, the above-spreader region where the combustion of the entrained fines occurs may be operated fuel-rich to minimize the conversion to $NO_x$ of the fuel nitrogen associated with the fines. Third, some air may be added under the spreader to promote the carbon oxidation in the over-spreader region, and hence, augment the fines combustion in this zone and promote the reduction of $NO_x$ produced in the bed region by hydrocarbon fragments evolved from the fines. One example of a chemical reaction mechanism which may be followed in such a reduction process is illustrated below:

$$CH + NO \rightarrow HCN + O \tag{1}$$

$$HCN + OH \rightarrow NCO + H_2 \tag{2}$$

$$NCO + H \rightarrow NH + CO \tag{3}$$

$$NH + NO \rightarrow N_2 + OH \tag{4}$$

Typical coal samples contain about five percent to about thirty percent (5%–30%) fine particles having a diameter of about 0.1 inches or less. As explained hereinabove, the introduction of such fine coal particles into over-spreader region C of furnace 10 helps to maintain the relatively low stoichiometric ratio of oxygen to combustible material needed in over-spreader region C. It will be recognized that the optimum amount of air introduced through overfire air ports 18a and 18b and overfire air ports 26a and 26b will thus depend on the exact amount of such fine particles in the coal employed.

A second and important aspect of the present invention is the associated reduction in particulate emissions which is due, in large part, to the relatively lower quantities of air introduced through the grate as underfire air and which flow through the bed and under-spreader regions of the spreader-stoker-fired furnace, as compared with the prior art. Since, in the spreader-stoker-fired furnace of the present invention, there is less air introduced through the grate supporting the burning fuel bed than in prior art furnaces, the vertical velocity of the air flowing through the burning fuel bed is correspondingly reduced. The result is fewer coal, ash, and other particulates being entrained in the air flow through the burning fuel bed.

Because the air flow through the bed, under-spreader, and over-spreader regions is substantially less than that experienced in the prior art, the air resistance through each of these regions of the furnace is substantially less than that of the prior art. This allows smaller particles of combustible materials, which would normally be entrained in the upwardly rising flow of gases in the prior art processes, to fall to the grate of the spreader-stoker-fired furnace of the present invention. Such particles would thus be combusted in the burning fuel bed rather than be entrained in the furnace effluent, thereby resulting in an even greater reduction in particulate emissions in the present invention.

The particulate emissions of the $NO_x$ experiments of FIG. 4 were also measured, and these data are reported in FIG. 6. Thus, FIG. 6 illustrates the influence of stoichiometry distribution and fines percentage on overall particulate emissions. As seen in FIG. 6, at a fines level of 15%, application of the present invention resulted in a decrease of particulate emissions over conventional method from about 1.2 lb/$10^6$ Btu to about 0.4 lb/$10^6$ Btu.

It will be appreciated by those of ordinary skill in the art that the stoichiometric control techniques of the present invention may be employed with virtually any conventional spreader-stoker-fired furnace, and that the spreader-stoker-fired furnace 10 illustrated in FIG. 1 is given by way of example only. Indeed, one of the primary advantages of the method and apparatus of the present invention is that stoichiometric control techniques of the present invention may be used in virtually any existing spreader-stoker-fired furnace, thereby eliminating the need to replace existing furnaces with completely new equipment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A method for reducing pollutant emissions in a spreader-stoker-fired furnace, the method comprising the steps of:
    obtaining particles of a combustible material;
    introducing the particles of combustible material into a spreader-stoker-fired furnace by a spreading means, the spreader-stoker-fired furnace having a bed region at the bottom thereof, an under-spreader region between the bed region and the spreading means, and an over-spreader region above the spreading means;
    combusting the particles of combustible material within the spreader-stoker-fired furnace in the presence of oxygen; and
    controlling the amount of oxygen flowing into the spreader-stoker-fired furnace such that the stoichiometric ratio of oxygen to combustible material is within the range of from about 0.6 to about 0.8 in the bed region of the spreader-stoker-fired furnace, is within the range of from about 0.9 to about 1.1 in the under-spreader region of the spreader-stoker-fired furnace, and is within the range of from about 0.75 to about 0.95 in the over-spreader region of the spreader-stoker-fired furnace.

2. A method for reducing pollutant emissions in a spreader-stoker-fired furnace as defined in claim 1 wherein the stoichiometric ratio of oxygen to combustible material is about 0.7 in the bed region, about 1 in the under-spreader region, and about 0.85 in the over-spreader region of the spreader-stoker-fired furnace.

3. A method for reducing pollutant emissions in a spreader-stoker-fired furnace, the method comprising the steps of:
    obtaining particles of a combustible material having a significant propensity for clinker formation;
    introducing the particles of combustible material into a spreader-stoker-fired furnace by a spreading means, the spreader-stoker-fired furnace having a bed region at the bottom thereof, an under-spreader region between the bed region and the spreading means, and an over-spreader region above the spreading means;
    combusting the particles of combustible material within the spreader-stoker-fired furnace in the presence of oxygen; and
    controlling the amount of oxygen flowing into the spreader-stoker-fired furnace such that the stoichiometric ratio of oxygen to combustible material is within the range of from about 1.0 to about 1.2 in the bed region of the spreader-stoker-fired furnace, is within the range of from about 1.0 to about 1.2 in the under-spreader region of the spreader-stoker-fired furnace, and is within the range of from about 0.75 to about 0.95 in the over-spreader region of the spreader-stoker-fired furnace.

4. An apparatus for producing heat from a combustible material with reduced pollutant emissions, comprising:
    a spreader-stoker-fired furnace having spreading means for introducing particles of a combustible material into the spreader-stoker-fired furnace, the spreader-stoker-fired furnace having a bed region at the bottom thereof, an under-spreader region between the bed region and the spreading means, and an over-spreader region above the spreading means; and
    means for controlling the stoichiometric ratio of oxygen to combustible material in the spreader-stoker-fired furnace such that the stoichiometric ratio is within the range of from about 0.6 to about 0.8 in the bed region, is within the range of from about 0.9 to about 1.1 in the under-spreader region, and is within the range of from about 0.75 to about 0.95 in the over-spreader region of the spreader-stoker-fired furnace.

5. An apparatus as defined in claim 4 wherein said controlling means comprises means for controlling the stoichiometric ratio of oxygen to combustible material in the spreader-stoker-fired furnace such that the stoichiometric ratio is about 0.7 in the bed region, about 1 in the under-spreader region, and about 0.85 in the over-spreader region of the spreader-stoker-fired furnace.

6. An apparatus for producing heat from a combustible material with reduced pollutant emissions, comprising:
    a spreader-stoker-fired furnace having spreading means for introducing particles of a combustible material having a significant propensity for clinker formation into the spreader-stoker-fired furnace, the spreader-stoker-fired furnace having a bed region at the bottom thereof, an under-spreader region between the bed region and the spreading means, and an over-spreader region above the spreading means; and
    means for controlling the stoichiometric ratio of oxygen to combustible material in the spreader-stoker-fired furnace such that the stoichiometric ratio is within the range of from about 1.0 to about 1.2 in the bed region, is within the range of from about 1.0 to about 1.2 in the under-spreader region, and is within the range of from about 0.75 to about 0.95 in the over-spreader region of the spreader-stoker-fired furnace.

* * * * *